US006935391B2

(12) United States Patent
Naito et al.

(10) Patent No.: US 6,935,391 B2
(45) Date of Patent: Aug. 30, 2005

(54) SELF-SEAL TIRE AND MANUFACTURING METHOD OF THE SAME

(75) Inventors: Mitsuru Naito, Hiratsuka (JP); Hidekazu Takeyama, Hiratsuka (JP); Satoshi Makino, Wako (JP); Yasuhiro Miyatani, Wako (JP); Takayuki Toyoshima, Wako (JP)

(73) Assignees: The Yokohama Rubber Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 264 days.

(21) Appl. No.: 10/312,389

(22) PCT Filed: Mar. 15, 2002

(86) PCT No.: PCT/JP02/02499

§ 371 (c)(1),
(2), (4) Date: Dec. 26, 2002

(87) PCT Pub. No.: WO02/076768

PCT Pub. Date: Oct. 3, 2002

(65) Prior Publication Data

US 2003/0150544 A1 Aug. 14, 2003

(30) Foreign Application Priority Data

Mar. 19, 2001 (JP) ........................................ 2001-078244
Mar. 8, 2002 (JP) ........................................ 2002-063316

(51) Int. Cl.$^7$ ............................ B60C 19/12; B29C 73/22
(52) U.S. Cl. .................... 152/154.1; 152/502; 152/504; 156/75; 156/115
(58) Field of Search .............................. 156/115, 123, 156/75; 152/154.1, 502–505, 510

(56) References Cited

U.S. PATENT DOCUMENTS 4,359,078 A * 11/1982 Egan ........................... 152/504
4,398,583 A 8/1983 Casey
2002/0036042 A1 * 3/2002 Takeyama et al. .......... 152/502

FOREIGN PATENT DOCUMENTS

| DE | 10138603 | * | 2/2002 |
| GB | 2 045 793 A1 | | 11/1980 |
| JP | 52-091903 A1 | | 7/1977 |
| JP | 54-006206 A1 | | 1/1979 |
| JP | 2001-018609 A1 | | 1/2001 |

OTHER PUBLICATIONS

PCT/JP02/02499 International Search Report mailed on Jun. 25, 2002.

* cited by examiner

Primary Examiner—Geoffrey L. Knable
(74) Attorney, Agent, or Firm—Rader, Fishman & Grauer PLLC

(57) ABSTRACT

A self-seal tire according to the present invention has a puncture sealing layer located all over a tire inner wall surface from one shoulder portion to the other shoulder portion of a pneumatic tire. The puncture sealing layer comprises at least one band-shape seal layer, which includes a band-shape sponge layer and a bonding layer, the band-shape sponge layer being impregnated with an adhesive so that it is exposed on a tier wall surface side face of the band-shape sponge layer and spaced apart from a tire counter wall surface side face thereof, and the bonding layer being made of adhesive and provided on the tire wall surface side face. The band-shape seal layer is bonded through the bonding layer on the tire inner wall surface with the band-shape seal layer being wound in a circumferential direction of the tire.

17 Claims, 3 Drawing Sheets

SELF-SEAL TIRE AND MANUFACTURING METHOD OF THE SAME

TECHNICAL FIELD

The present invention relates to a self-seal tire having a self-sealing function of sealing a puncture and preventing air from leaking outside the tire when it blows out by a nail or others penetrating its crown portion during traveling of a vehicle, and to a manufacturing method thereof.

TECHNICAL BACKGROUND

With the diffusion of highways, the demand for tires provided with a self-sealing function has been increasing day by day, and many self-seal tires have been proposed until now.

According to the typical structure of conventional self-seal tires proposed, there are mainly two types, one type having an adhesive with high viscosity as a sealing material applied to the inner surface of the tire crown portion, and the other type having a sponge layer impregnated with a similar adhesive, which is provided on the inner surface of the tire crown portion.

The former type, however, involves a problem that, when the tire turns at a high seed, the adhesive can not seal a puncture in the vicinity of the shoulder portions, because it flows to the center side of the crown portion by centrifugal force.

The latter type needs to use an adhesive containing solvent in order to make the whole sponge layer sufficiently impregnated with the high viscosity adhesive. Therefore, an environmental problem due to volatiling of the solvent cannot be avoided. In addition, there is a drawback in handling of the tire, because the fully adhesive containing sponge layer is exposed on the tire inner surface side.

Though there is no direct relation with the air sealing, tires having an uneven dynamic balance are often obtained when manufactured. When the tire of this type is assembled to a rim, a weight for rectifying the dynamic balance is usually attached to the rim.

Such problem of tire dynamic balance rectification has been hitherto one of problems which bother those skilled in the art.

DISCLOSURE OF THE INVENTION

It is an object of the present invention to provide a self-seal tire and manufacturing method thereof, which is easy to handle and excellent in dynamic balance, and prevents an adhesive from moving during traveling of a vehicle, and causes no environmental problem due to volatiling of solvent.

In order to achieve the aforementioned object, a self-seal tire according to the present invention includes a pneumatic tire and a puncture sealing layer located over a entire tire inner wall surface from one shoulder portion to the other shoulder portion of the pneumatic tire, the puncture sealing layer comprising at least one band-shape seal layer having a band-shape sponge layer and a bonding layer, the band-shape sponge layer being impregnated with an adhesive so as to be exposed on a tier wall surface side face of the band-shape sponge layer and spaced apart from a tire counter wall surface side face thereof, the bonding layer being made of adhesive and provided on the tire wall surface side face, and the band-shape seal layer being bonded through the bonding layer on the tire inner wall surface with the band-shape seal layer being wound in a circumferential direction of the tire.

A self-seal tire manufacturing method according to the present invention comprises the steps of pressing an adhesive into at least one band-shape sponge layer from its tire wall surface side so that the adhesive is exposed on the tire wall surface side face and spaced apart from a tire counter wall surface side face thereof to form an adhesive impregnated sponge layer that is impregnated with the adhesive, attaching by press a bonding layer made of adhesive onto the tire wall surface side face of the adhesive impregnated sponge layer to form a band-shape seal layer, and winding in a circumferential direction of a pneumatic tire and bonding the band-shape seal layer all over an inner wall surface of the tire from one shoulder portion to the other shoulder portion of the tire with adjacent tire width direction ends of the band-shape seal layer being butted.

Another self-seal tire manufacturing method according to the present invention comprises the steps of attaching by press an adhesive to a tire wall surface side of a band-shape sponge layer so that the adhesive is exposed on the tire wall surface side face and spaced apart from a tire counter wall surface side face thereof, and a bonding layer is integrally formed of the adhesive on the tire wall surface side face of the sponge layer impregnated with the adhesive, thereby forming at least one band-shape seal layer, and winding in a circumferential direction of a pneumatic tire and bonding the band-shape seal layer all over an inner wall surface of the tire from one shoulder portion to the other shoulder portion of the tire with adjacent tire width direction ends of the band-shape seal layer being butted.

According to the above-described self-seal tire of the present invention, flow of the adhesive by centrifugal force can be prevented during traveling of a vehicle because the adhesive is impregnated into the sponge layer. As a result, a puncture hole in the vicinity of the shoulder portions can be sealed.

The handling of the tire can be facilitated since the adhesive is impregnated such that it is exposed on the tire wall surface side of the sponge layer and is not exposed on an inner surface side of the self-tier tire.

The use of the band-shape seal layer having the sponge layer partially impregnated with the adhesive enables the amount of adhesive with which the sponge layer is impregnated to be easily adjusted corresponding to a given area of the tire inner wall surface. Thus, by changing the impregnation amount of the adhesive with which the sponge layer is to be impregnated in an area of the band-shape seal layer to be bonded to a dynamically imbalanced point, based on the measurement data of the dynamic balance, the dynamic balance can be uniformed along the tire circumference.

Since the sponge layer has a surface side into which adhesive is not impregnated, and is not fully impregnated with adhesive, an adhesive not containing solvent can be impregnated into the sponge layer by pressing the adhesive into the sponge layer from another surface thereof (tire wall surface side face) by pressing means. As a result, an adhesive which doe not contain solvent can be used, thereby producing no environmental problem due to volatiling of solvent.

Even thought the adhesive is impregnated so that it is spaced apart from the tire counter wall surface side face, as described above, since the bonding layer is composed of the same type of adhesive as that with which the sponge layer is impregnated, a sufficient quantity of adhesive can be secured in the puncture sealing layer, thereby not reducing a good puncture sealing capacity.

BEST MODES FOR CARRYING OUT THE INVENTION

The embodiments of the present invention will be described below with reference to the drawings. In respective drawings, the same components are assigned the same symbols, and duplicated description will be omitted.

Figure 1:
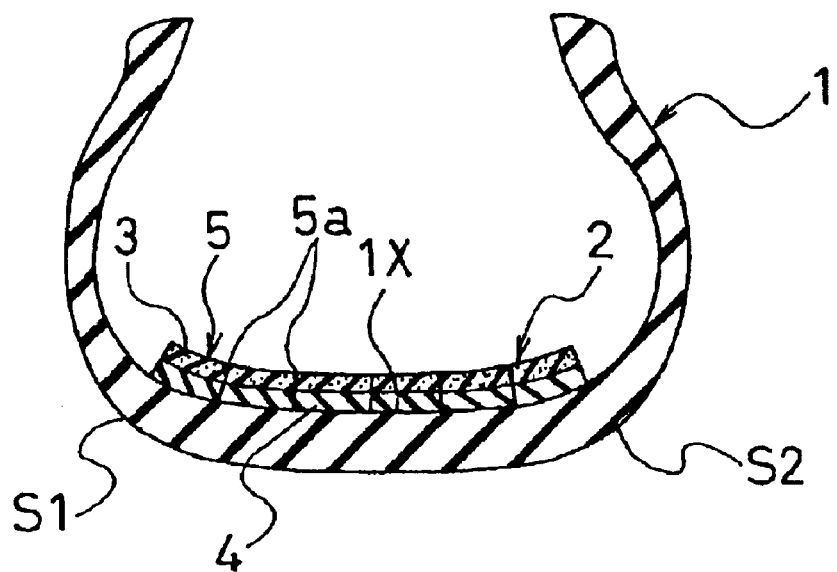
FIG. 1 is a schematic view sectioned in a tire meridian direction showing a self-seal tire according to the present invention.

Referring to FIG. 1, the self-seal tire of the present invention has a puncture sealing layer 2 disposed all over a tire inner wall surface 1X from one shoulder portion S1 to the other shoulder portion S2 of a pneumatic tire 1.

Figure 2:
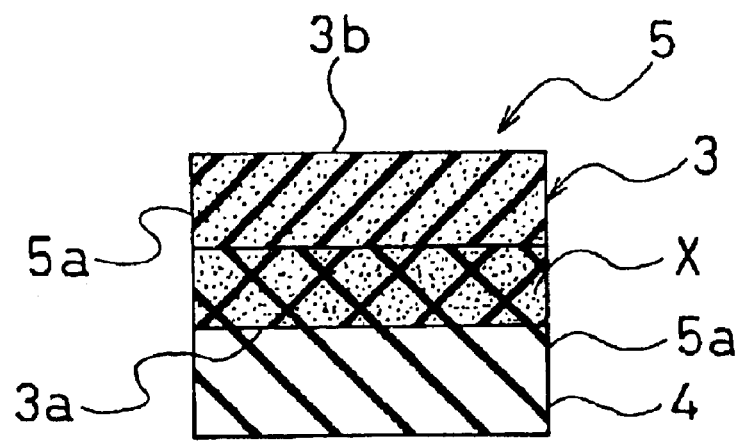
FIG. 2 is an enlarged section of the band-shape seal layer in FIG. 1.

The puncture sealing layer 2 comprises, as shown in FIG. 2, a band-shape seal layer 5 composed of a band-shape sponge layer 3 and a bonding layer 4, the band-shape sponge layer 3 being impregnated with a high viscosity adhesive X as sealing material which is exposed on its tire wall surface side face 3a and is not exposed on its tire counter wall surface side face 3b by spacing apart therefrom, the bonding layer 4 being provided on the tire wall surface side face 3a of the sponge layer 3.

The bonding layer 4 is made of the same adherent composition and has the same high viscosity as the adhesive X, and is formed integrally with the adhesive X on the tire wall surface side face 3a of the sponge layer 3.

The band-shape seal layer 5 is wound on the tire inner wall surface 1X in the tire circumferential direction without forming any gap by making tire width direction ends 5a of adjacent band-shape seal layer portions into contact with each other, and stuck to the tire inner surface 1X through the bonding layer 4.

Reinforcement layers such as a carcass layer, belt layers, etc. are not shown in the pneumatic tire 1 of FIG. 1 as they are not characteristics of the present invention, but the pneumatic tire 1 employed in the self-seal tire of the present invention has reinforcement layers such as a carcass layer, belt layers, bead cores and the like that an ordinary pneumatic tire includes.

The self-seal tire having the aforementioned puncture sealing layer 2 is manufactured as follows.

Figure 3:
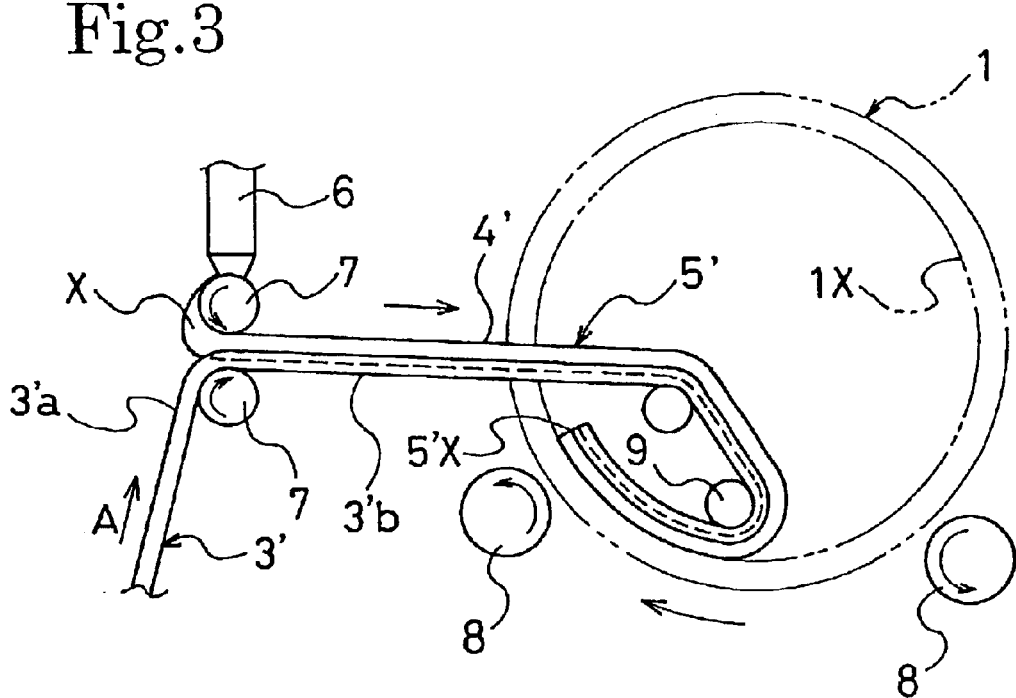
FIG. 3 is a schematic view showing main steps of a method of manufacturing the self-seal tire of FIG. 1.

As shown in FIG. 3, the adhesive X discharged from a nozzle 6 of an adhesive extruder is consecutively press attached by means of a pair of rotating rollers 7, 7 onto a tire wall surface side face 3'a of a continuous band-shape sponge layer 3' transported in the direction of arrow A, whereby the sponge layer 3' is impregnated with the adhesive X so that the adhesive is not exposed on the tire counter wall surface side by spacing apart from a tire counter wall surface side face 3'b of the sponge layer 3' and, at the same time, a bonding layer 4' made of the adhesive X is integrally formed on the tire wall surface side face 3'a of the band-shape sponge layer 3' to form a band-shape seal layer 5'.

Next, a leading end portion 5'X of the formed band-shape seal layer 5' is introduced onto the inner wall surface 1X of the pneumatic tire 1 previously formed by vulcanization, and is attached by press to one shoulder portion S1. Thereafter, while the pneumatic tire us rotated by rollers 8, 8 turning in the arrow direction, the band-shape seal layer 5' is consecutively attached by press onto the inner wall surface 1X by a roller 9 in such a manner that the band-shape seal layer 5' is being shifted in the tire width direction by a guide not shown and adjacent tire width direction ends of the band-shape seal layer 5' are butted, whereby the band-shape seal layer 5' is consecutively bonded onto the tire inner wall surface 1X with the layer 5' wound in the tire circumferential direction.

After the band-shape seal layer 5' is bonded up to the other shoulder portion S2 of the tire inner wall surface 1X, the supply of the band-shape seal layer 5' and the rotation of the pneumatic tire 1 are stopped. The band-shape seal layer 5' is then cut off to release it from the tire inner wall surface 1X before finishing the manufacturing of the self-seal tire shown in FIG. 1.

Figure 4:
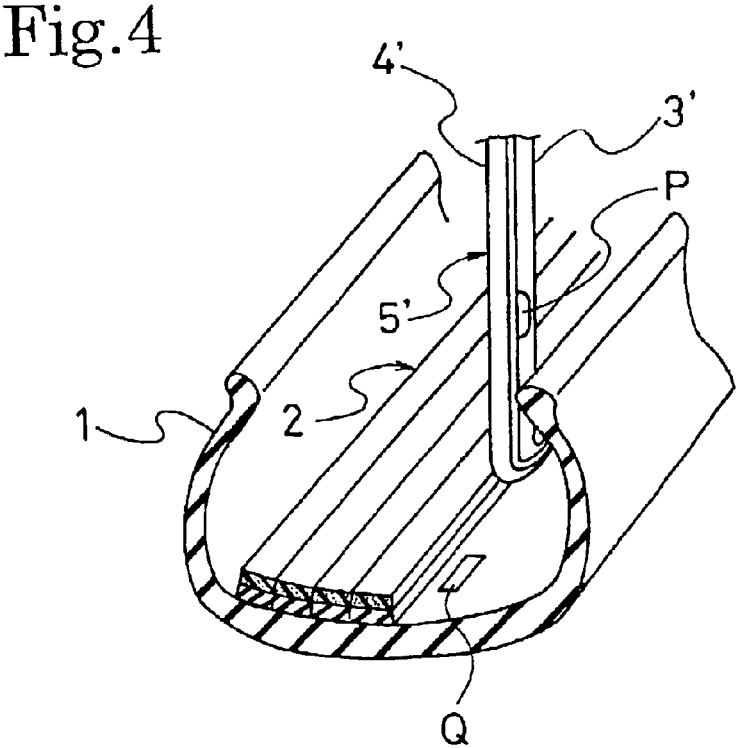
FIG. 4 is a perspective view schematically showing a main part of a step for bonding a band-shape seal layer onto a pneumatic tire having a dynamically imbalanced point.

In case where the pneumatic tire 1 has a dynamically imbalanced point Q as shown in FIG. 4, the dynamic balance is adjusted to be even by changing the impregnation quantity of the adhesive X with which the sponge layer 3 is to be impregnated in an area of the band-shape seal layer 5 bonded to the dynamically imbalanced point Q.

Such adjustment of the impregnation amount of the adhesive X is performed by changing the discharge rate of the adhesive X from the nozzle 6 at an area P of the sponge layer 3' corresponding to the dynamically imbalanced point Q, or by differentiating the rotation speed of the upper roller 7 for press attaching the adhesive X and the lower roller 7 for conveying the sponge lager 3', based on the measurement data of the dynamic balance measured previously. This uniformly arranges the tire weight balance along the tire circumference, allowing a good dynamic balance to be obtained.

According to the above-mentioned self-seal tire of the present invention, flow of the adhesive X by centrifugal force can be prevented during traveling of a vehicle, since the adhesive X used for the puncture sealing layer 2 is impregnated into the sponge layer 3.

The tire handling is facilitated, because the adhesive X is not exposed on the tire counter wall surface side of the sponge layer 3.

The use of the band-shape seal layer 5 having the sponge layer 3 partially impregnated with the adhesive X makes possible to easily adjust the amount of the adhesive X with which the sponge layer 3 is impregnated in correspondence with a given area of the tire inner wall surface 1X. As a result, it becomes possible to uniform the dynamic balance along the tire circumference by changing the impregnation amount of the adhesive X with which the sponge layer 3 is impregnated in the area P of the band-shape seal layer 5 to be bonded to the dynamically imbalanced point Q, based on the measurement data of the dynamic balance.

Since the sponge layer is not fully impregnated with adhesive, the sponge layer 3 can be impregnated with an adhesive not containing solvent by press impregnating of the adhesive X from the tire wall surface side of the sponge layer 3. Accordingly, an environmental problem due to volatiling of solvent can be avoided.

A good puncture sealing capacity can be achieved, because a sufficient quantity of adhesive can be secured in the puncture sealing layer 2 without impregnating the whole sponge layer 3 with the adhesive X as the bonding layer 4 is composed of the adhesive X with which the sponge layer 3 is impregnated.

Figure 5:
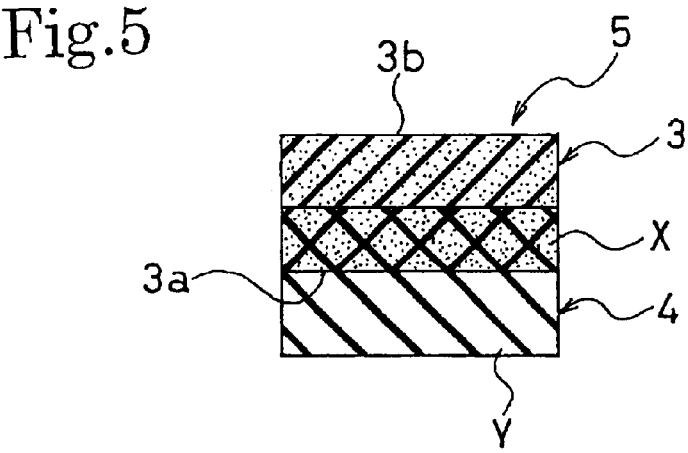
FIG. 5 is an enlarged section of another band-shape seal layer to be used for the self-seal tire of the present invention.

FIG. 5 shows a band-shape seal layer 5 as another example to be used for the self-seal tire of the present invention. In this band-shape seal layer 5, the bonding layer 4 is composed of a high viscosity adhesive Y made of an adherent composition different from the adhesive X.

Figure 6:
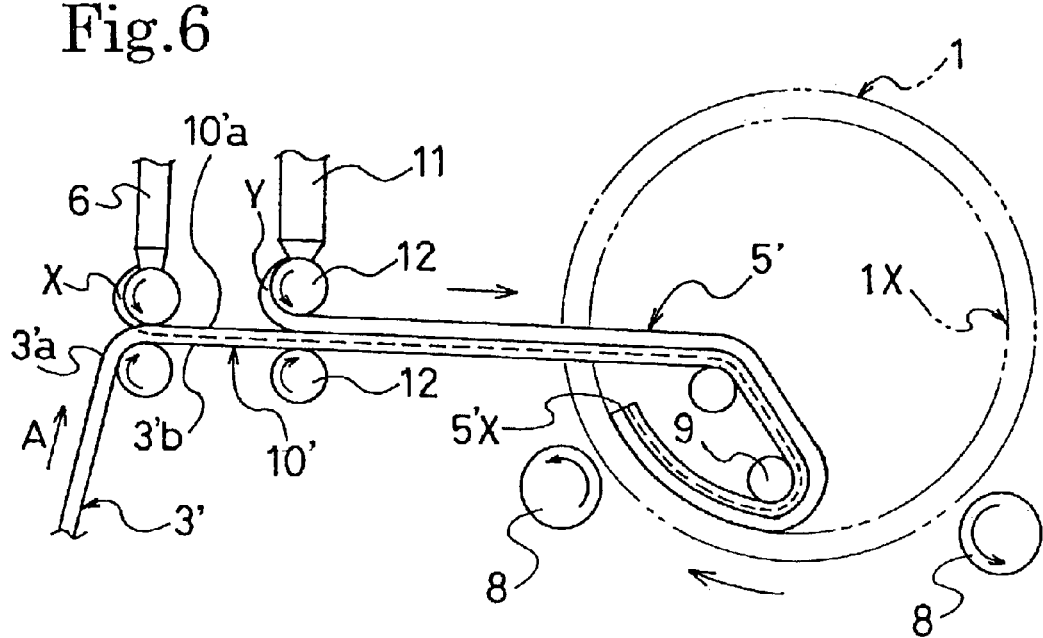
FIG. 6 is a schematic view showing main steps of a method of manufacturing a self-seal tire using the band-shape seal layer of FIG. 5.

In case of the self-seal tire using such band-shape seal layer 5, as shown in FIG. 6, the adhesive X discharged from a nozzle 6 of a first adhesive extruder is consecutively pressed into the band-shape sponge layer 3' from the tire wall surface side face 3'a of the band-shape sponge layer 3' transported in the direction of arrow A by means of a pair of rotating rollers 7, 7, thereby forming an adhesive impregnated sponge layer 10' impregnated with the adhesive X which is not exposed on the tire counter wall surface side of the sponge layer 3'.

Next, the adhesive Y discharged from a nozzle 11 of a second adhesive extruder is consecutively attached by press onto a tire wall surface side face 10'a of the adhesive impregnated sponge layer 10' (tire wall surface side face 3'a of the band-shape sponge layer 3') by means of a pair of rotating rollers 12, 12 to form a band-shape seal layer 5'. The steps following this are done as in FIG. 3.

Thus the same effects described above can be obtained even when the bonding layer 4 of the band-shape seal layer 5 is formed of an adherent material different from the adhesive X.

The band-shape seal layer 5 shown in FIG. 5 may also be formed by forming a bonding layer 4 on the tire inner wall surface 1X, and by sticking to the bonding layer 4 an adhesive impregnated sponge layer 10' impregnated with the adhesive X so that it is not exposed on the tire counter wall surface side of the sponge layer. The bonding layer 4 used here may also be formed using the adhesive X.

Figure 7:
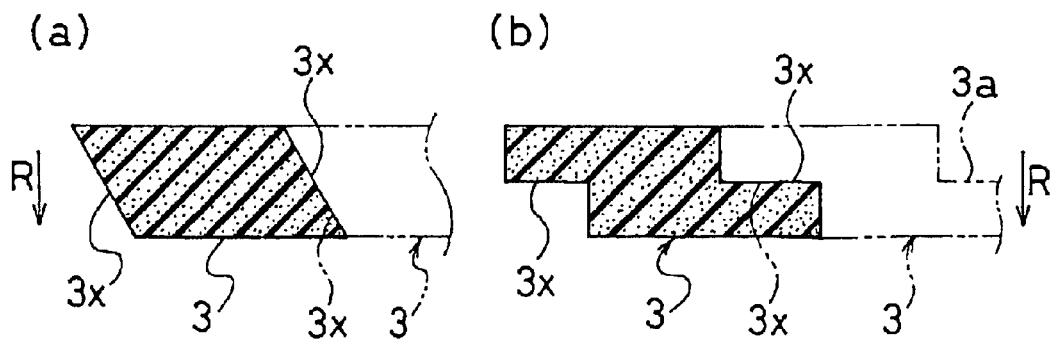
FIGS. 7(a) and (b) are enlarged sections showing examples of preferred sponge layers, respectively.

In the present invention, the shape of the sponge layer 3 may be rectangular in section, as shown in FIGS. 2 and 5; however, it is preferably of a parallelogram in section as shown in FIG. 7(a), or shaped in section such that a pair of opposed corners of a rectangle are cut off in rectangle as shown in FIG. 7(b), so that adjacent width direction end portions 3x of the sponge layer 3 superpose each other in the tire radial direction R. As a result, a gap that would deteriorate the sealing capacity is prevented from occurring between the adjacent portions of the band-shape seal layer 5' when the band-shape seal layer 5' is attached by press onto the tire inner wall surface 1X with the band-shape seal layer 5' wound in the tire circumferential direction.

As material composing the aforementioned sponge layer 3, a foam of rubber, polyurethane, nylon or other resins having a continuous bubble into which the adhesive X can be impregnated may preferably be used. It is desirable to employ continuous bubble type ether system polyurethane foam.

As adherent composition used for the adhesive X, an elastomer blended with an amorphous polyolefin, paraffin oil, or tackifier such as petroleum resin or low molecular weigh oligomer which is, for example, liquid polybutene can preferably be used. The elastomer may preferably be, for instance, at least one type of elastomer selected from a group of butyl rubber, polyisobutylene, natural rubber, isoprene rubber and polybutene in order to enhance the air impermeability of the tire in a normal use state with no puncture.

Also, in case of forming the bonding layer 4 with the adhesive X, the aforementioned elastomer blended with tackifier such as petroleum resin or low molecular weigh oligomer which is, for example, liquid polybutene can be used as the adhesive.

The adherent composition used for the adhesive Y may be one as used in the case of forming the bonding layer 4 with the adhesive X.

It is preferable that the adhesives X, Y are made of an adherent composition not containing solvent, and that the viscosity thereof is adjusted to be about 1000 Pa·s.

In the present invention, as mentioned above, it is preferable to form the puncture sealing layer 2, from the viewpoint of productivity, by bonding one band-shape seal layer 5 onto the tire inner wall surface 1X winding it in the tire circumferential direction, while shifting it in the tire width direction; however, the puncture sealing layer 2 may also be formed by bonding a plurality of band-shape seal layers, respectively, onto the tire inner wall surface 1X in the tire circumferential direction.

As mentioned above, the present invention can prevent the adhesive from flowing by centrifugal force generated during tire rotation and also make easy handling of the tire by adopting the puncture sealing layer impregnated with the adhesive in a way to be exposed on the tire wall surface side of the sponge layer and not to be exposed on the tire counter wall surface side.

The use of the band-shape seal layer having the sponge layer partially impregnated with adhesive makes possible to easily adjust the quantity of adhesive with which the sponge layer is impregnated in a given area of the tire inner wall surface, thereby allowing a self-seal tire having an uniform dynamic balance to be produced by changing the weight of adhesive along the tire circumference based on the dynamic balance measurement data.

Also, it becomes possible to impregnate the sponge layer with an adhesive not containing solvent by pressing it into the sponge layer since it is unnecessary to impregnate the whole sponge layer with adhesive, allowing an excellent self-seal tire in terms of environment to be provided free from volatiling and diffusing of solvent.

Industrial Applicability

The present invention having the aforementioned excellent effects can be used extremely effectively as a self-seal tire having a self-sealing function of sealing a puncture and preventing air from leaking outside the tire when it blows out by a nail or others penetrating its crown portion during traveling of a vehicle.

What is claimed is:

1. A self-seal tire having a pneumatic tire and a puncture sealing layer located over a whole tire inner wall surface from one shoulder portion to the other shoulder portion of the pneumatic tire, wherein said puncture sealing layer comprises at least one band-shape seal layer having a band-shape sponge layer and a bonding layer, the band-shape sponge layer being impregnated with an adhesive so that it is exposed on a tire wall surface side face of the band-shape sponge layer and spaced apart from a tire counter wall surface side face thereof, the bonding layer being made of adhesive and provided on the tire wall surface side face, and the band-shape seal layer being bonded through said bonding layer on said tire inner wall surface with the band-shape seal layer being wound in a circumferential direction of the tire.

2. The self-seal tire of claim 1, wherein said bonding layer is made of the same adherent composition as the adhesive with which said sponge layer is impregnated.

3. The self-seal tire of claim 2, wherein said bonding layer is integrally formed on the tire wall surface side face of said sponge layer.

4. The self-seal tire of claim 1, 2 or 3, wherein said pneumatic tire has a dynamically imbalanced point, and its dynamic balance is adjusted to be uniform by changing the quantity of the adhesive with which said sponge layer is impregnated in an area of the band-shape seal layer bonded to the dynamically imbalanced point.

5. The self-seal tire of any one of claims 1 to 3, wherein adjacent width direction end portions of said sponge layer are configured to superpose each other in a radial direction of the tire.

6. A self-seal tire manufacturing method comprising the steps of:

pressing an adhesive into at least one band-shape sponge layer from its tire wall surface side so that the adhesive is exposed on the tire wall surface side face and spaced apart from a tire counter wall surface side face thereof to form an adhesive impregnated sponge layer that is impregnated with the adhesive;

attaching by press a bonding layer made of adhesive onto the tire wall surface side face of the adhesive impregnated sponge layer to form a band-shape seal layer; and winding in a circumferential direction of a pneumatic tire and bonding the band-shape seal layer all over an inner wall surface of the tire from one shoulder portion to the other shoulder portion of the tire with adjacent tire width direction ends of the band-shape seal layer being butted.

7. The self-seal tire manufacturing method of claim 6, wherein said band-shape seal layer is composed of one continuous band-shape seal layer, and the winding and bonding step further comprises attaching by press the continuous band-shape seal layer onto the tire inner wall surface of the pneumatic tire which is rotated while shifting the band-shape seal layer in a width direction of the tire.

8. The self-seal tire manufacturing method of claim 6 or 7, wherein said pneumatic tire has a dynamically imbalanced point, and the adhesive pressing step further comprises changing and adjusting the quantity of the adhesive with which the sponge layer is to be impregnated in an area of the band-shape seal layer to be bonded to the dynamically imbalanced point to make an even dynamic balance.

9. A self-seal tire manufacturing method comprising the steps of:

attaching by press an adhesive to a tire wall surface side of a band-shape sponge layer so that the adhesive is exposed on the tire wall surface side face and spaced apart from a tire counter wall surface side face thereof, and a bonding layer is integrally formed of the adhesive on the tire wall surface side face of the sponge layer impregnated with the adhesive, thereby forming at least one band-shape seal layer, and winding in a circumferential direction of a pneumatic tire and bonding the band-shape seal layer all over an inner wall surface of the tire from one shoulder portion to the other shoulder portion of the tire with adjacent tire width direction ends of the band-shape seal layer being butted.

10. The self-seal tire manufacturing method of claim 9, wherein said band-shape seal layer is composed of one continuous band-shape seal layer, and the winding and bonding step further comprises attaching by press the continuous band-shape seal layer onto the tire inner wall surface of the pneumatic tire which is rotated while shifting the band-shape seal layer in a width direction of the tire.

11. The self-seal tire manufacturing method of claim 9 or 10, wherein said pneumatic tire has a dynamically imbalanced point, and the adhesive pressing step further comprises changing and adjusting the quantity of the adhesive with which the sponge layer is to be impregnated in an area of the band-shape seal layer to be bonded to the dynamically imbalanced point to make an even dynamic balance.

12. The self-seal tire manufacturing method of claim 9 or 10, wherein said adhesive is made of adherent composition not containing solvent.

13. The self-seal tire of claim 1, wherein the bonding layer is made of an adherent composition different from the adhesive impregnating the band-shape sponge layer.

14. The self-seal tire of claim 1, wherein the bonding layer and the adhesive impregnating the band-shape sponge layer are made of an adherent composition not containing solvent.

15. The self-seal tire of claim 2, wherein said adherent composition does not contain solvent.

16. The self-seal tire manufacturing method of claim 6, wherein the adhesive pressed into the sponge layer is made of an adherent composition not containing solvent.

17. The self-seal tire manufacturing method of claim 6, wherein the bonding layer and the adhesive pressed into the sponge layer are made of an adherent composition not containing solvent.

* * * * *